No. 826,563. PATENTED JULY 24, 1906.
E. J. GEORGE.
ADHESIVE GUARD FOR EYEGLASSES.
APPLICATION FILED AUG. 26, 1905.
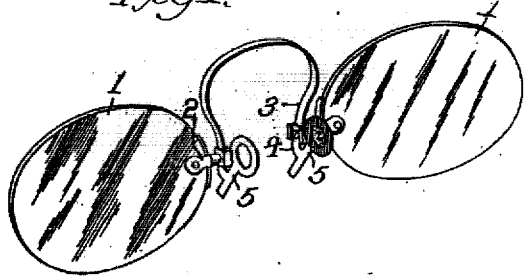
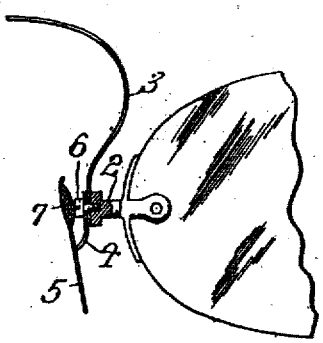
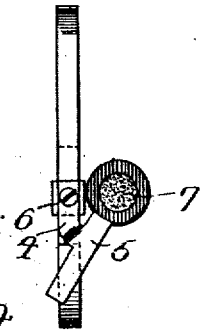
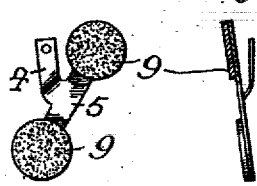
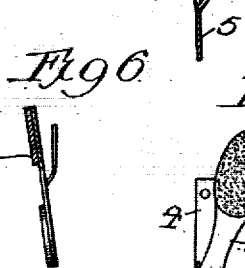
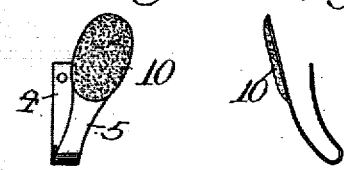
Witnesses:
Edw. P. Barrett
Louis B. Erwin
Inventor
Edgar J. George
By Rector & Kibben
His Atty's

UNITED STATES PATENT OFFICE.

EDGAR J. GEORGE, OF CHICAGO, ILLINOIS.

ADHESIVE GUARD FOR EYEGLASSES.

No. 826,563.

Specification of Letters Patent.

Patented July 24, 1906.

Application filed August 26, 1905. Serial No. 275,894.

*To all whom it may concern:*

Be it known that I, EDGAR J. GEORGE, a citizen of the United States, residing at Chicago, in the county of Cook and State of Illinois, have invented a certain new and useful Adhesive Guard for Eyeglasses, of which the following is a specification.

My invention relates to nose-guards for eyeglasses; and the object of my invention is to provide a simple and practical guard which will adhere firmly to the nose of the wearer and afford a firm and secure support for the glasses.

It is well known to those familiar with the practical use of eyeglasses that it has heretofore been difficult to provide guards which will clasp the nose of the wearer with sufficient firmness to hold the glasses in position securely, and this is particularly the case in some forms of the bridge of the nose and in warm weather owing to perspiration. By means of my invention I attain a much more secure attachment of the guards to the nose than has heretofore been done in any other way, so far as I am aware.

In the drawings, Figure 1 is a perspective of a pair of eyeglasses, showing a pair of guards; Fig. 2, a cross-section of the guard shown in Fig. 1 and the stud or post to which it is attached, part of the stud and lens being shown in elevation; Fig. 3, a side view of the right-hand guard of the pair; Fig. 4, a detail cross-section of the end of the guard; Fig. 5, a side view of a modified form of guard; Fig. 6, a cross-section of the same; Fig. 7, a side view of another modified form of guard, and Fig. 8 a cross-section of the same.

Similar numerals of reference refer to similar parts throughout the several views.

In all eyeglasses of the type illustrated and to which my invention is particularly applicable the pair of lenses and associated parts forming the complete structure are supported upon a pair of opposing contact-surfaces resting upon and pressed by the stress of a suitable spring into close contact with the sides of the bridge of the nose of the wearer. These contact-surfaces are commonly formed upon the inner surfaces of a pair of guards attached to the structure in such manner as to be pressed inwardly toward each other by the spring, and the frictional contact thus obtained between the surfaces of the guard and the nose of the wearer has heretofore alone been relied upon to support and maintain the glasses in position.

My invention consists in forming these contact-surfaces of an adhesive material or coating them with an adhesive material or substance to increase the holding power of the guards by means of adhesion between them and the skin of the nose. I have found that ordinary rosin possesses the desired properties; but my invention may also be practiced by the employment of many other substances—such as various resins, gums, waxes, and the like and their combinations and compositions which possess the adhesive properties mentioned.

I have illustrated my invention in the drawings as applied to eyeglasses of a common and well-known form, in which the lenses 1 are mounted in studs or posts 2, having block-shaped inner ends which have vertical channels formed in them at their inner ends to receive the ends of the spring 3 and the shanks 4 of the pair of guards 5 5. Small screws 6, passing through holes in the ends of the spring and the shanks of the guards into the studs, secure the parts firmly together.

In the form of guard shown in Figs. 1, 2, 3, and 4 the two opposite guards of a pair have curved shanks 4 and straight portions, which at their upper ends are formed into circular portions which are cupped or concaved to form cavities on their inner opposite surfaces for the reception of fillings 7 of the adhesive substance above described, such fillings constituting the contact-surfaces of the guards.

I also contemplate practicing my invention by forming the adhesive substance or material into small pieces of suitable shape, such as small thin disks, and cementing them to the opposite inner surfaces of suitable guards. In this way I am able to provide for replacing the adhesive contact-surfaces very easily and quickly whenever it is desirable to do so. In Figs. 5 and 6 I have shown a guard of somewhat different pattern than that hereinbefore described, having two flat circular ends, to which such disks 9 9 are cemented.

In Figs. 7 and 8 I have shown a guard of still another form in which the adhesive substance is in the form of a coating 10, flowed or otherwise applied directly upon the opposite slightly-convex surfaces of the upper oval portions of the guards.

It will be understood from the foregoing that my invention may be applied to nose-guards of any pattern or design and upon eyeglasses of any kind, the particular method of attaching the guards to the other parts of the structure and the relations between the other parts being immaterial so far as my invention is concerned. It will also be understood that the particular means of securing the adhesive substance or material to the guards may be varied as desired. The surface of the guards may be either grooved or indented to form depressions to receive the adhesive substance, and the latter may be flowed on when heated, or applied in liquid form, or, as before stated, the adhesive material may be formed into disks or other suitable forms and cemented to flat surfaces upon the guards.

Having thus fully described my invention, I claim—

1. In eyeglasses, means for supporting the glasses upon the nose having opposite contact-surfaces adapted to embrace the nose and composed of a substantially solid substance having adhesive properties.

2. In eyeglasses, guards for supporting the glasses upon the nose having their opposite surfaces composed of a substantially solid substance having adhesive properties.

3. In eyeglasses, guards having the opposite inner surfaces of the metallic portion thereof indented and having such indentations filled with an adhesive substance constituting the contact-surface of the guard.

4. In eyeglasses, guards having opposite grasping-surfaces composed of a substantially solid substance having adhesive properties and when in operative position under pressure tending to cause them to embrace the sides of the nose to hold the glasses in position thereon.

5. In eyeglasses, guards having the opposite inner surfaces of the metallic portion thereof indented and having such indentations filled with an adhesive substance constituting the contact-surface of the guards, said guards being under pressure tending to cause them to embrace the sides of the nose to hold the glasses in position thereon.

6. In eyeglasses, metal guards having their opposite inner surfaces indented and the indentations filled with resin, said guards being under pressure tending to cause them to embrace the sides of the nose to hold the glasses in position thereon.

7. In eyeglasses, means for retaining the glasses upon the nose having inwardly-disposed opposite contact-surfaces composed of a substantially solid substance having adhesive properties.

8. In eyeglasses, guards having their inner opposite surfaces indented and having the indentations filled with an adhesive material constituting the contact-surface of the guard.

9. In eyeglasses, guards having their inner opposite grasping-surfaces formed into cups, said cups being filled with a non-elastic adhesive material forming the contact-surfaces of the guards.

10. In eyeglasses, guards having opposite grasping-surfaces composed of a substantially solid substance having adhesive properties, said guards in operative position being under pressure tending to cause them to embrace the sides of the nose.

11. In eyeglasses, the combination, with the guards, of tablets of a substantially solid substance having adhesive properties cemented to the inner faces of the guards and adapted to bear against the opposite sides of the nose under the pressure of the guards; substantially as described.

EDGAR J. GEORGE.

Witnesses:
S. E. HIBBEN,
LOUIS B. ERWIN.